(12) United States Patent
Daubenspeck et al.

(10) Patent No.: US 8,575,007 B2
(45) Date of Patent: Nov. 5, 2013

(54) SELECTIVE ELECTROMIGRATION IMPROVEMENT FOR HIGH CURRENT C4S

(75) Inventors: Timothy Harrison Daubenspeck, Colchester, VT (US); Jeffrey P. Gambino, Westford, VT (US); Christopher David Muzzy, Burlington, VT (US); Wolfgang Sauter, Hinesburg, VT (US); Thomas Anthony Wassick, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/073,181

(22) Filed: Mar. 28, 2011

(65) Prior Publication Data
US 2012/0248604 A1    Oct. 4, 2012

(51) Int. Cl.
*H01L 21/326* (2006.01)
*H01L 21/44* (2006.01)

(52) U.S. Cl.
USPC ............. 438/468; 438/17; 438/613; 438/927; 257/E21.508

(58) Field of Classification Search
USPC ............. 438/468, 927, 613, 17; 257/E21.508
See application file for complete search history.

(56) References Cited

U.S. PATENT DOCUMENTS

| | | | |
|---|---|---|---|
| 6,767,411 B2 | 7/2004 | Yeh et al. | |
| 6,811,892 B2 | 11/2004 | Yeh et al. | |
| 7,064,570 B2 | 6/2006 | Buffet et al. | |
| 7,242,097 B2 * | 7/2007 | Hua | 257/767 |
| 7,480,874 B2 * | 1/2009 | Banoo et al. | 716/112 |
| 7,784,010 B1 | 8/2010 | Balsdon et al. | |
| 8,212,357 B2 * | 7/2012 | Daubenspeck et al. | 257/738 |
| 2006/0038302 A1 | 2/2006 | Zeng | |
| 2007/0222073 A1 | 9/2007 | Farooq et al. | |

(Continued)

FOREIGN PATENT DOCUMENTS

JP    2006313800 A    11/2006

OTHER PUBLICATIONS

Nagaraj, Vishal. "Flip Chip Back End Design Parameters to Reduce Bump Electromigration." The University of Texas at Arlington. Aug. 2008.

Ghaida, Rani S. and Zarkesh-Ha, Payman. "A Layout Sensitivity Model for Estimating Electromigration-vulnerable Narrow Interconnects." Springer Science + Business Media, LLC. Copyright 2008.

(Continued)

*Primary Examiner* — Nitin Parekh
(74) *Attorney, Agent, or Firm* — Nicholas L. Cadmus; Jason H. Sosa; David Cain

(57) ABSTRACT

The invention includes embodiments of a method for designing a flip chip and the resulting structure. The starting point is a flip chip with a semiconductor substrate, one or more wiring levels, and a plurality of I/O contact pads (last metal pads/bond pads) for receiving and sending electrical current. There is also a plurality of C4 bumps for connecting the I/O contact pads to another substrate. Then it is determined which of the C4s of the plurality of C4 bumps have a level of susceptibility to electromigration damage that meets or exceeds a threshold level of susceptibility, and in response, plating a conductive structure with a high electrical current carrying capacity (such as a copper pillar, copper pedestal, or partial copper pedestal) onto the corresponding I/O contact pads and adding a solder ball to a top portion of the conductive structure. The resulting structure is a flip chip wherein only a select few C4 bumps use enhanced C4s (such as copper pedestals) reducing the chance of defects.

5 Claims, 4 Drawing Sheets

(56) References Cited

U.S. PATENT DOCUMENTS

| | | |
|---|---|---|
| 2009/0164183 A1 | 6/2009 | Smith et al. |
| 2010/0094609 A1 | 4/2010 | Han et al. |
| 2010/0219528 A1* | 9/2010 | Zhao et al. ............... 257/737 |
| 2011/0248398 A1* | 10/2011 | Parvarandeh et al. ....... 257/737 |
| 2012/0153458 A1* | 6/2012 | Howard et al. ............. 257/737 |

OTHER PUBLICATIONS

Kang, Sung K. "IBM Research Report: Effects of Minor Alloying Additions on the Properties and Reliability of Pb-free Solders and Joints." IBM Research Division—TJ Watson Research Center, Yorktown Heights, NY. Sep. 14, 2010.

* cited by examiner

FAILURE RATE PER C4

| CURRENT (mA) | NEGATIVE C4 (GROUND) NEG C4 COUNT | NEG TOTAL FR | FR FRACTION |
|---|---|---|---|
| 250 | 0 | 0.00 | |
| 240 | 0 | 0.00 | |
| 230 | 2 | 6.89 | 25.33% |
| 220 | 4 | 8.33 | 30.62% |
| 210 | 2 | 2.43 | 8.94% |
| 200 | 4 | 2.73 | 10.03% |
| 190 | 6 | 2.20 | 8.08% |
| 180 | 11 | 2.06 | 7.58% |
| 170 | 13 | 1.18 | 4.33% |
| 160 | 9 | 0.37 | 1.36% |
| 150 | 27 | 0.47 | 1.72% |
| 140 | 50 | 0.34 | 1.24% |
| 130 | 53 | 0.13 | 0.46% |
| 120 | 81 | 0.06 | 0.22% |
| 110 | 84 | 0.02 | 0.06% |
| 100 | 96 | 0.00 | |
| 90 | 91 | 0.00 | |
| 80 | 131 | 0.00 | |
| 70 | 120 | 0.00 | |
| 60 | 173 | 0.00 | |
| 50 | 398 | 0.00 | |
| 40 | 629 | 0.00 | |
| 30 | 873 | 0.00 | |
| 20 | 621 | 0.00 | |
| 10 | 0 | 0.00 | |

TOP 51 C4's ACCOUNT FOR > 96% OF FR

FIG. 3

SELECTIVE ELECTROMIGRATION IMPROVEMENT FOR HIGH CURRENT C4S

BACKGROUND

The disclosure relates generally to semiconductor chip design and more specifically to electromigration improvement in select C4s.

Traditionally, high temperature C4 (Controlled Collapse Chip Connection) bumps have been used to bond a chip to a substrate with the most common and widely utilized package being an organic laminate. Chips utilizing C4 bumps are known as flip chips. Conventionally, the C4 bumps (solder bumps) are made from leaded solder, as it has superior properties. For example, lead is known to mitigate thermal coefficient (TCE) mismatch between the chip and the substrate (i.e., organic laminate). Accordingly, stresses imposed during the cooling cycle are mitigated by the C4 bumps, thus preventing delaminations or other damage from occurring to the chip or the substrate. One common leaded solder includes tin and lead (SnPb) alloys. Other non-leaded conventional solders include, in a non-exhaustive list, Sn, SnAg, SnAgCu, SnBi, SnCu, and various combinations and alloys of the preceding.

As chip functionality increases at a relatively constant chip size, and high performance chips require more power and generate higher temperatures, electromigration damage in the C4s needs to be considered more carefully. To reduce electromigration concerns in a flip chip, designers sometimes replace all of the conventional C4 bumps with high electrical current carrying capacity conductive structures, such as copper pillars or copper pedestals, and attach a solder bump to the conductive structure. These may be referred to herein as enhanced C4 bumps.

With the use of enhanced C4 bumps, the stresses imposed on the flip chip, especially during the cool-down from the chip join process, are not as well mitigated as with the use of conventional C4s. The high shear stresses caused by the TCE mismatch between the chip and organic laminate, now connected by a high current capacity conductive structure, such as a copper pedestal, may result in C4 interconnection defects (i.e., small cracks or voids in the chip metallurgy under C4 bumps). These defects are known as white bumps because they appear as white features when using acoustic micro-imaging (AMI) techniques. White bumps prevent good electrical contact to a chip's input/output (I/O) contact pad (also referred to as a last metal pad or bond pad), and may lead to the failure of a device or the entire chip.

SUMMARY

One aspect of the invention includes a method for designing a flip chip. The method comprises providing the flip chip. The flip chip comprises a semiconductor substrate comprising one or more semiconductor materials. The flip chip further comprises a device coupled to the semiconductor substrate. The flip chip further comprises a first and second wiring level, separated by a dielectric layer, wherein at least one of the first and second wiring levels is electrically connected to the device, and wherein the first and second wiring levels are interconnected through the dielectric layer by a conductive via. The flip chip further comprises a plurality of input/output (I/O) contact pads on a surface of the flip chip, wherein the at least one of the plurality of I/O contact pads is electrically connected to the at least one of the first and second wiring levels, and wherein the plurality of I/O contact pads are capable of receiving an electrical current to the flip chip and sending an electrical current from the flip chip. The flip chip further comprises a plurality of controlled collapse chip connection (C4) bumps for connecting the plurality of I/O contact pads to off-chip conductive paths. The method then comprises the step of determining that a C4 bump of the plurality of C4 bumps has a level of susceptibility to electromigration damage that meets or exceeds a threshold level of susceptibility, and in response, plating a conductive structure with a high electrical current carrying capacity onto a corresponding I/O contact pad from the plurality of I/O contact pads and adding a solder ball to a top portion of the conductive structure.

Another aspect of the invention includes a flip chip comprising a semiconductor substrate comprising one or more semiconductor materials. The flip chip further comprises a device coupled to the semiconductor substrate. The flip chip further comprises a first and second wiring level, separated by a dielectric layer, wherein at least one of the first and second wiring levels is electrically connected to the device, and wherein the first and second levels are interconnected through the dielectric layer by a conductive via. The flip chip further comprises a plurality of input/output (I/O) contact pads on a surface of the flip chip wherein at least one of the plurality of I/O contact pads is electrically connected to at least one of the first and second wiring levels, and wherein the plurality of I/O contact pads are capable of receiving an electrical current to the flip chip and sending an electrical current from the flip chip. The flip chip further comprises a plurality of controlled collapse chip connection (C4) bumps for connecting the plurality of I/O contact pads to off-chip conductive paths. The flip chip further comprises a number of C4 bumps from the plurality of C4 bumps, wherein the number of C4 bumps is fewer than the plurality of C4 bumps, and wherein each of the number of C4 bumps comprises a conductive structure with a high electrical current carrying capacity electrically connected to a corresponding I/O contact pad from the plurality of I/O contact pads and a solder ball attached to a top portion of the conductive structure.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which:

FIG. 3 illustrates a failure rate analysis for an exemplary flip chip in accordance with an illustrative embodiment;

DETAILED DESCRIPTION

Figure 1:
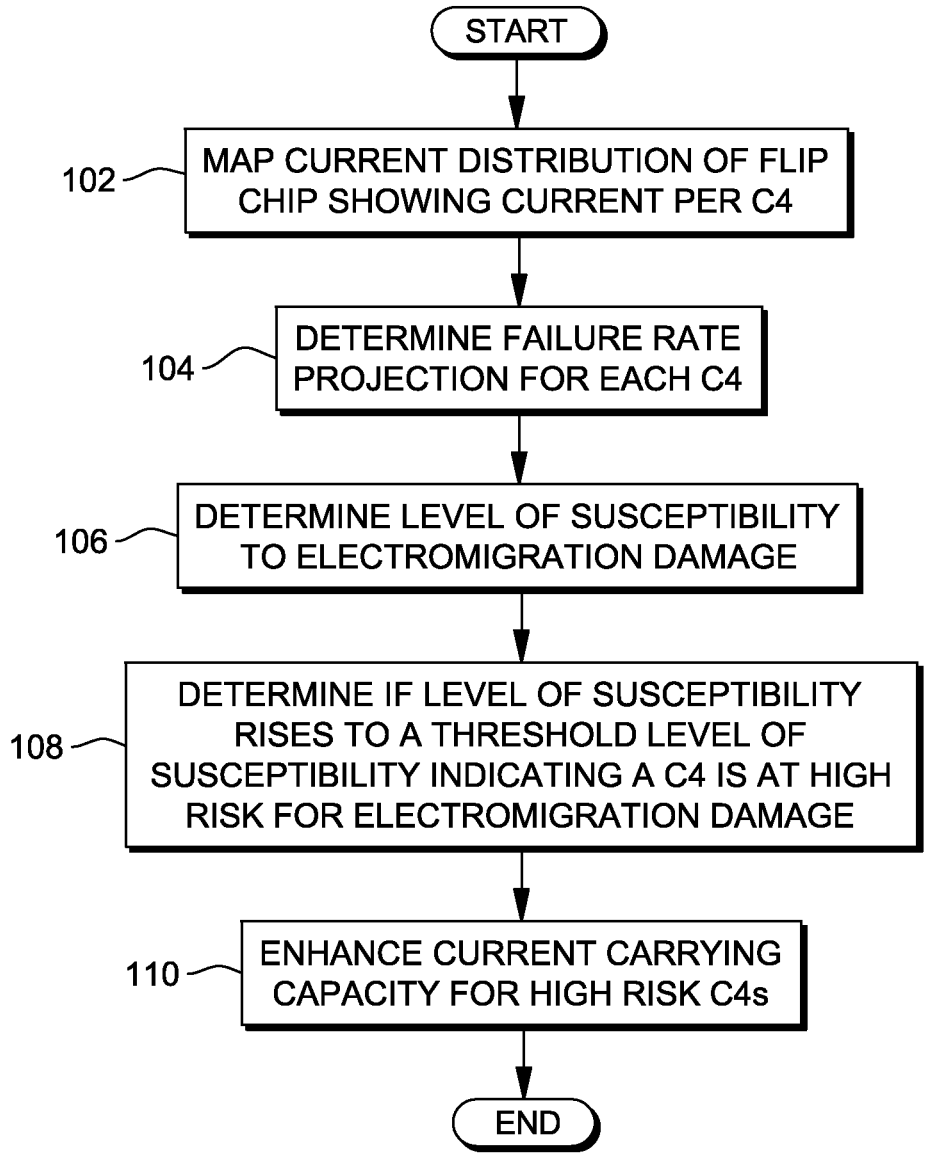
FIG. 1 illustrates a flowchart of a process for constructing a flip chip, depicted in accordance with an illustrative embodiment.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the course of developing the invention, the inventors found that the amount of C4 bumps at high risk for electromigration damage due to higher currents and temperature are very few. To replace all C4 bumps with C4 bumps containing enhanced conductive structures with high electrical current carrying capacity unnecessarily subjects each C4 to higher stresses and the possibility of defects or white bumps. Therefore the inventors developed a method for constructing a chip in which it is determined which C4 bumps to selectively enhance and the inventors developed the resulting chip wherein only the high risk C4 bumps contain the enhanced conductive structures.

With reference now to the figures, and in particular, to FIG. 1, a flowchart of a process for constructing a flip chip is depicted in accordance with an illustrative embodiment.

The first step is to receive a map of the current distribution for a flip chip design (step 102) by showing the maximum amount of current that may flow through a C4 bump at any given time. The electrical current per C4 is a function of what the C4 is electrically connected to within the chip. For example, a C4 may be connected to any number of different devices. Certain areas in the chip (such as processor cores) require more power than other areas.

As a given device requires a certain current, one can determine how much current to deliver to each C4 in order to make each corresponding device operational. This determining can be done with electrical modeling software. Semiconductor chips often have a corresponding power map available which specifies how much current to deliver to each C4. This power map may be used as the current distribution map. In another embodiment, the current distribution map may be based on the power map, where format may be changed and/or higher electrical currents within the chip highlighted. In another embodiment still, a chip designer may use electrical current device requirements to determine his or her own current distribution map for the flip chip.

Next, determine a failure rate projection for each C4 (step 104) based on the current distribution map.

Many types of C4s exist. Different solder material/elements may be used, the construction of a ball-limiting metallurgy (BLM) may be different and/or use different elements, various seeding layers may be deposited, and other structures, designs, elements and combinations of the preceding may be used. Each type of C4 may perform very differently from another.

In one embodiment, the type of C4 being used for the chip design undergoes electromigration testing. Such a process typically involves special test chips that allow very precise resistance measurement capability through individual C4s. Different electrical currents may be run through the C4s in a chamber heated to a certain temperature. Based on the fails over time, a fail rate may be established for the used conditions. The fail rate for the C4s in the test chips may be calculated to the use conditions of the actual product to provide an accurate projection of the fail rate for a given C4 with a given current.

Data from electromigration testing may be saved in a table/menu and used for projecting fail rates for C4s in various flip chip designs, where the type of C4 is the same as the C4 tested. Similarly, chip designs (including the applicable current distribution and failure rates) may be stored in a table/menu so that no calculations for that chip design in the future will be necessary. For any chip not in a menu, such as a server chip, a custom calculation may be performed to make sure that the failure rate is acceptable for the chip's application.

Based on the failure rate of a C4, the next step is to determine the level of susceptibility of the C4 to electromigration damage (step 106). The level of susceptibility is based on the failure rate of the C4.

In one embodiment, the level of susceptibility is the failure rate, indicated as a percentage of likely failure. In another embodiment the level of susceptibility is the percentage of all potential failures attributable to the C4. This can be calculated as the failure rate of the C4 over a total failure rate of all C4s in the chip, times 100.

Next, determine if the level of susceptibility rises to a threshold level of susceptibility indicating that the C4 is at a high risk for electromigration damages (step 108). The threshold level of susceptibility may be any selected potential value of the level of susceptibility and will preferably be a percentage of the failure rate of the C4 or the percentage of all potential failures attributable to the C4. In one embodiment, the threshold level of susceptibility may be any failure rate over zero (0). In another embodiment the threshold level of susceptibility is may be a failure rate between zero and one percent. In another embodiment still, the threshold level of susceptibility is the percentage of all potential failures attributable to the C4 and is selected from the values between zero and two percent.

Any C4s determined to be high risk (meets or exceeds the threshold level of susceptibility), are then subject to the step of enhancing the electrical current carrying capability of the C4s (step 110). No change will occur to non-high risk C4s.

Enhancing the electrical current carrying capacity of a C4, as briefly discussed in the background, in one embodiment comprises plating a conductive structure (with high electrical current carrying capacity) onto a corresponding I/O contact pad. The two will be connected electrically, though there may be intervening seeding layers and BLM materials. The conductive structure is preferably a copper pedestal, a partial copper pedestal, or a copper pillar. A solder ball is attached to a top portion of the conductive structure.

Figure 2:
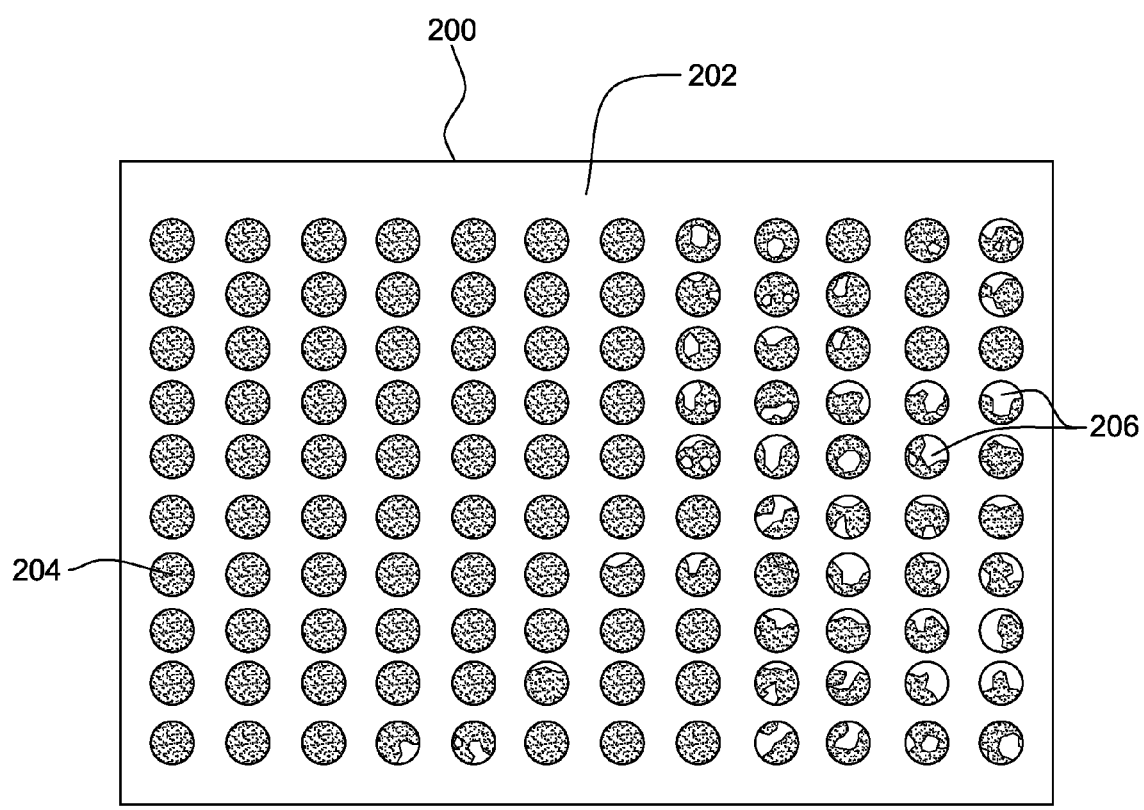
FIG. 2 depicts a flip chip using enhanced C4s under acoustic micro-imaging in accordance with an illustrative embodiment.

FIG. 2 depicts a flip chip using enhanced C4s under acoustic micro-imaging in accordance with an illustrative embodiment. Flip chip 200 is a semiconductor chip using flip chip technology where enhanced C4s have been utilized.

Flip chip 200 is composed of a semiconductor substrate (not shown), one or more wiring levels (not shown), chip surface 202, and C4 bumps, such as enhanced C4 bump 204. Though enhanced C4 bumps increase the electrical current carrying capacity of the C4, and hence reduces the risk of electromigration damage, the rigidity of the structures used to make the enhanced C4s (copper pedestals, copper pillars) increases the stresses on the chip. White bumps 206 are examples of defects created during the cooling process due to the TCE mismatch between enhanced C4s, such as C4 204, and chip surface 202.

FIG. 3 illustrates a failure rate analysis for an exemplary flip chip. Chart 300 displays different elements to the failure rate analysis including: current 302, negative C4 count 304, negative total failure rate 306, and failure rate fraction 308.

Current 302 is measured in milliamps (mA). Electrical current running through a C4 typically runs from 10 to 250 mA.

Negative C4 count 304 represents the number of negative C4s corresponding to a given electrical current. "Negative" refers to the direction of electrical current flow—here meaning that electrical current is flowing through the C4 into the chip. "Positive" would mean that current is flowing through the C4 from the chip.

In the current depiction the total count for negative C4s is 3,478. A typical flip chip might have anywhere from 1,000 to 12,000 C4s, though it is possible to have as few as 2 C4s and as many as 20,000.

Negative total failure rate 306 represents the projected failure rate for a C4 running a certain amount of current. For example, a C4 running 230 mA of current has a projected failure rate of 6.89 percent, whereas a C4 running 110 mA has a projected failure rate of 0.02 percent.

Failure rate fraction 308 is the percentage of projected failures made up by C4s running a certain amount of current. For example the projected failure rate of 6.89 percent for C4s running 230 mA of current accounts for 25.33 percent of all projected failures.

High current segment 310 represents a subset of C4s running some of the highest currents. In the depicted example, all C4s in high current segment 310 run electrical currents of 160 mA or higher. Out of the representative 3,478 C4s, only 51 C4s run this much electrical current. These 51 C4s (less than 1.5% of all C4s in the chip) account for more than 96% of all projected failures. If C4s with currents of 190 mA were selected, one would see that 18 (or approximately 0.5%) of all C4s account for over 80% of all projected failures.

It is from these numbers that a level of susceptibility and threshold may be chosen from. Preferably, levels of susceptibility are chosen from the total failure rate 306 or failure rate fraction 308, though in other embodiments levels of susceptibility could be chosen from electrical current being ran through a C4 (all C4s that run 160 mA or greater) or even the top few C4s with the most current running through them (top 50 C4s for example).

By then matching these numbers meeting a selected threshold level to the C4s on the current distribution map, the C4s at highest risk may be selectively enhanced without increasing the risk of white bumps throughout the whole chip.

Figure 4A:
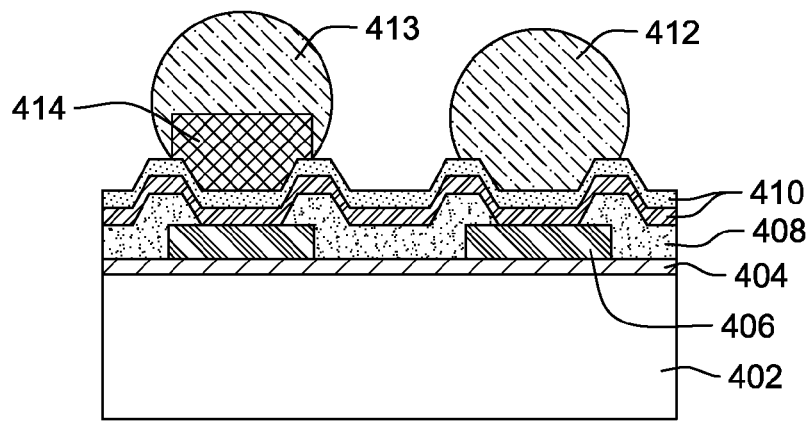
FIG. 4A depicts a flip chip comprising both a conventional C4 and a copper pillar C4 in accordance with an illustrative embodiment.
Figure 4B:
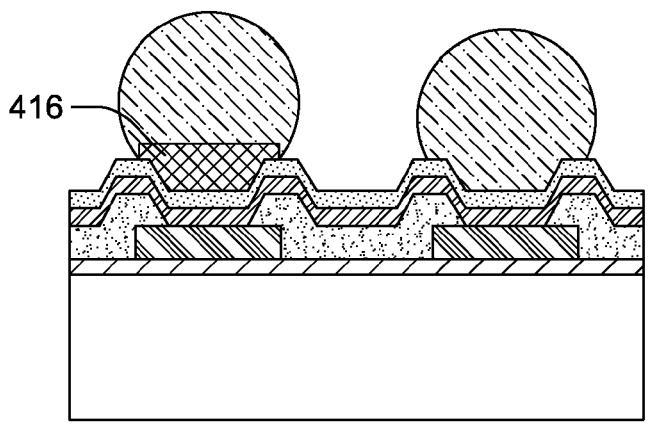
FIG. 4B depicts a flip chip comprising both a conventional C4 and a copper pedestal C4 in accordance with an illustrative embodiment.
Figure 4C:
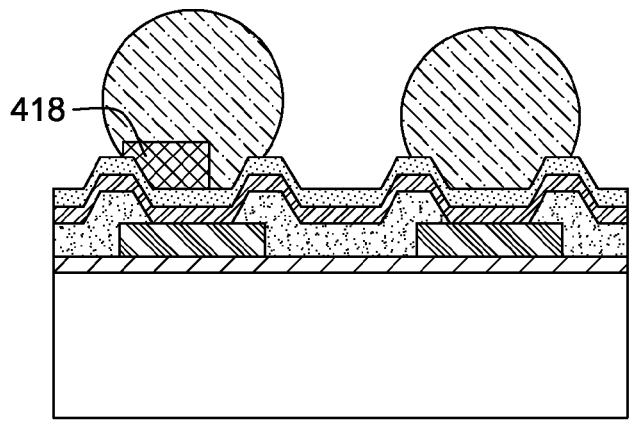
FIG. 4C depicts a flip chip comprising both a conventional C4 and a partial copper pedestal C4 in accordance with an illustrative embodiment.

FIGS. 4A-4C depicts three illustrative embodiments of a flip chip. FIG. 4A depicts a flip chip comprising both a conventional C4 and an enhanced C4, in this embodiment the enhanced C4 is represented by a copper pillar. FIG. 4B similarly depicts a flip chip, here with the enhanced C4 represented by a copper pedestal. FIG. 4C shows the enhanced C4 represented by a partial copper pedestal.

Semiconductor substrate 402 may be composed of any semiconductor material(s) such as a silicon containing material. Silicon containing materials include, but are not limited to, Si, single crystal Si, polycrystalline Si, SiGe, single crystal silicon germanium, polycrystalline silicon germanium, or silicon doped with carbon, amorphous Si and combinations and multi-layers thereof. Semiconductor substrate 402 may also be composed of other semiconductor materials, such as germanium, and compound semiconductor substrates, such as type III/V semiconductor substrates, e.g., GaAs. Although semiconductor substrate 402 is depicted as a bulk semiconductor substrate, semiconductor on insulator (SOI) substrate arrangements, such as silicon on insulator substrates, are also suitable for semiconductor substrate 402.

One or more devices (not shown) are coupled to semiconductor substrate 402.

Interconnect structure 404, also known as back-end-of-the-line (BEOL) wiring levels (or wiring levels) comprises one or more wiring levels, separated by one or more dielectric layers, electrically connected to the one or more devices. Wiring levels are interconnected through the dielectric layers by conductive vias.

I/O contact pad 406 is made of a conductive material, often aluminum or copper, and electrically connects to the top wiring level of interconnect structure 404. I/O contact pad 406 is capable of transmitting an electrical current either to a flip chip and the chip's devices or from the devices to off-chip electrical circuits/paths.

Isolation layer 408 is made up of a non-conductive material and may include one or more layers of passivation layers (oxide, nitride, etc.) or other dielectric layers, and combinations of the two.

Seed layers 410 as depicted, show two layers, preferably of titanium tungsten (TiW) and Copper (Cu). In other embodiments there may be one or more seed layers which may be composed of Aluminum (Al), Nickel (N), Copper (Cu), Titanium (Ti), Tungsten (W), other conductive elements, and combinations of the preceding.

Together, these layers may form, at least in part, a capture pad ideal for adhesion between I/O contact pad 406 and a C4. The capture pad may also be referred to as a ball-limiting metallurgy (BLM) or an under-bump metallization (UBM) and typically forms the very bottom layer of the C4.

In FIG. 4A one C4 is made up of a conventional solder ball 412 positioned on seed layers 410. A second C4 is made up of copper pillar 414 positioned on seed layers 410 and solder ball 413 attached to a top portion of copper pillar 414. Copper pillar 414 may be 40 microns deep and allows current to be distributed uniformly through solder ball 413.

In FIG. 4B one C4 is made up of a conventional solder ball. A second C4 is made up of copper pedestal 416 and solder 413 attached to a top portion of copper pedestal 413. A copper pedestal is distinguishable from a copper pillar mainly by thickness. A copper pedestal might only be 10 microns deep compared to a copper pillar's 40 micron depth. A copper pedestal may be considered part of the BLM, as it acts as another layer on which to apply the solder ball. Similar to the copper pillar 414, copper pedestal 416 allows current to be distributed uniformly through solder ball 413.

FIG. 4C depicts a flip chip comprising both a conventional C4, made up of a conventional solder ball 412, and a partial copper pedestal C4, comprising partial copper pedestal 418 and solder ball 413, in accordance with an illustrative embodiment. Partial copper pedestal 418 is formed over a portion of I/O contact pad 406, allowing solder ball 413 to contact both the enhanced conductive structure and the I/O contact pad (or the seeding layers on top of the I/O contact pad) at the same time.

Solder bumps, such as solder bump 412 or 413, may be formed or placed on the seeding layers, BLM, or enhanced conductive structure in many ways. These include evaporation, electroplating, printing, jetting, stud bumping, and direct placement. The results of these methods may differ in bump size and spacing (pitch), solder components and composition, cost, manufacturing time, equipment required, assembly temperature, and BLM.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described preferred embodiments of a semiconductor chip with enhanced electromigration performance in select C4 bumps (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. A method for designing a flip chip, the method comprising the steps of:
   providing the flip chip, wherein the flip chip comprises:
   a semiconductor substrate comprising one or more semiconductor materials;
   a device coupled to the semiconductor substrate;
   a first and second wiring level, separated by a dielectric layer, wherein at least one of the first and second wiring levels is electrically connected to the device, and wherein the first and second wiring levels are interconnected through the dielectric layer by a conductive via;
   a plurality of input/output (I/O) contact pads on a surface of the flip chip, wherein at least one of the plurality of I/O contact pads is electrically connected to one of the first and second wiring levels, and wherein the plurality of I/O contact pads are capable of receiving an electrical current to the flip chip and sending an electrical current from the flip chip;
   a plurality of controlled collapse chip connection (C4) bumps for connecting the plurality of I/O contact pads to off-chip conductive paths; and
   receiving a plurality of maximum electrical currents that may flow through the plurality of C4 bumps, wherein each maximum electrical current of the plurality of maximum electrical currents corresponds to one or more C4 bumps of the plurality of C4 bumps;
   determining a level of susceptibility to electromigration damage that meets or exceeds a threshold level of susceptibility for one or more C4 bumps of the plurality of C4 bumps corresponding to a certain maximum electrical current of the plurality of maximum electrical currents, wherein the level of susceptibility is based on a ratio determined by dividing a failure rate for a C4 bump of the plurality of C4 bumps corresponding to the certain maximum electrical current by a sum of failure rates for a C4 bump of the plurality of C4 bumps corresponding to each maximum electrical current of the plurality of maximum electrical currents;
   in response to determining the level of susceptibility, plating a conductive structure with a high electrical current carrying capacity onto one or more I/O contact pads of the plurality of I/O contact pads, wherein the one or more I/O contact pads correspond to the one or more C4 bumps of the plurality of C4 bumps corresponding to the certain maximum electrical current; and
   adding a solder ball to a top portion of each plated conductive structure.

2. The method of claim 1, wherein the level of susceptibility is the ratio resulting from dividing a failure rate for a C4 bump of the plurality of C4 bumps corresponding to the certain maximum electrical current by a sum of failure rates for a C4 bump of the plurality of C4 bumps corresponding to each maximum electrical current of the plurality of maximum electrical currents.

3. The method of claim 1, wherein the level of susceptibility is a percentage calculated by dividing the failure rate for a C4 bump of the plurality of C4 bumps corresponding to the certain maximum electrical current by a sum of failure rates for a C4 bump of the plurality of C4 bumps corresponding to each maximum electrical current of the plurality of maximum electrical currents and multiplying by 100.

4. The method of claim 3, wherein the threshold level of susceptibility is between 0 and 2 percent.

5. The method of claim 1, wherein the conductive structure is selected from the group consisting of a copper pillar, a copper pedestal, and a partial copper pedestal.

* * * * *